(12) United States Patent
Misawa

(10) Patent No.: US 12,553,730 B2
(45) Date of Patent: Feb. 17, 2026

(54) ROUTE SEARCH DEVICE

(71) Applicant: TOYOTA JIDOSHA KABUSHIKI KAISHA, Toyota (JP)

(72) Inventor: Takahiro Misawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 18/488,443

(22) Filed: Oct. 17, 2023

(65) Prior Publication Data

US 2024/0183676 A1 Jun. 6, 2024

(30) Foreign Application Priority Data

Dec. 8, 2022 (JP) .................................. 2022-196277

(51) Int. Cl.
*G01C 21/34* (2006.01)
*G06Q 50/06* (2024.01)

(52) U.S. Cl.
CPC ......... *G01C 21/3469* (2013.01); *G06Q 50/06* (2013.01)

(58) Field of Classification Search
CPC ............................ G06Q 50/06; G01C 21/3469
USPC ....................................................... 701/467
See application file for complete search history.

(56) References Cited

U.S. PATENT DOCUMENTS

| | | | | |
|---|---|---|---|---|
| 2019/0025068 A1* | 1/2019 | Yoshino | ............ | G06Q 30/0631 |
| 2023/0038012 A1* | 2/2023 | Erozlu | ............... | G01C 21/3679 |
| 2023/0249584 A1* | 8/2023 | Ogaki | .................... | H10K 71/70 |
| | | | | 701/22 |

FOREIGN PATENT DOCUMENTS

| | | | |
|---|---|---|---|
| JP | 2006-112932 A | | 4/2006 |
| JP | 2012-002778 A | | 1/2012 |
| JP | 2021-009108 A | | 1/2021 |
| WO | 2017/168685 A1 | | 10/2017 |

\* cited by examiner

*Primary Examiner* — Navid Z. Mehdizadeh
*Assistant Examiner* — Vincent Feng
(74) *Attorney, Agent, or Firm* — SoraIP, Inc.

(57) ABSTRACT

A route search device includes: a route search unit that searches for a route for a vehicle that runs on power of a rechargeable battery to reach a destination; a station search unit that searches for a plurality of charging stations that is geographically available to the vehicle based on the searched route, and acquires output information of chargers installed in each of the charging stations; a calculation unit that calculates, for each of the searched charging stations, a predicted value indicating a future state of the battery when the vehicle reaches the charging station, based on a current state of the battery and a route from a current location of the vehicle to the charging station; and a recommended station extraction unit that extracts a recommended station from the searched charging stations, based on combinations of the predicted values of the battery and the output information of the chargers.

7 Claims, 3 Drawing Sheets

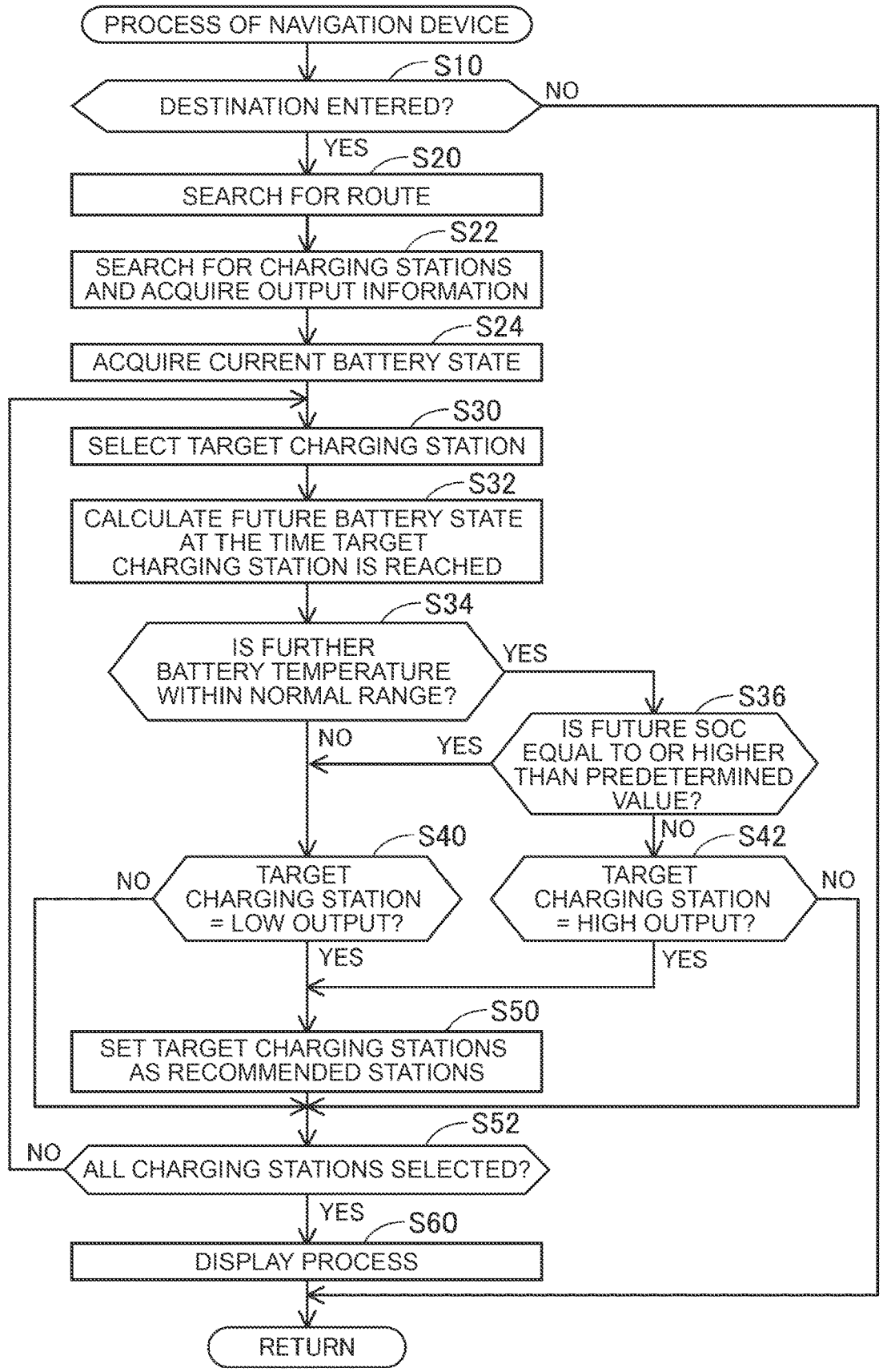

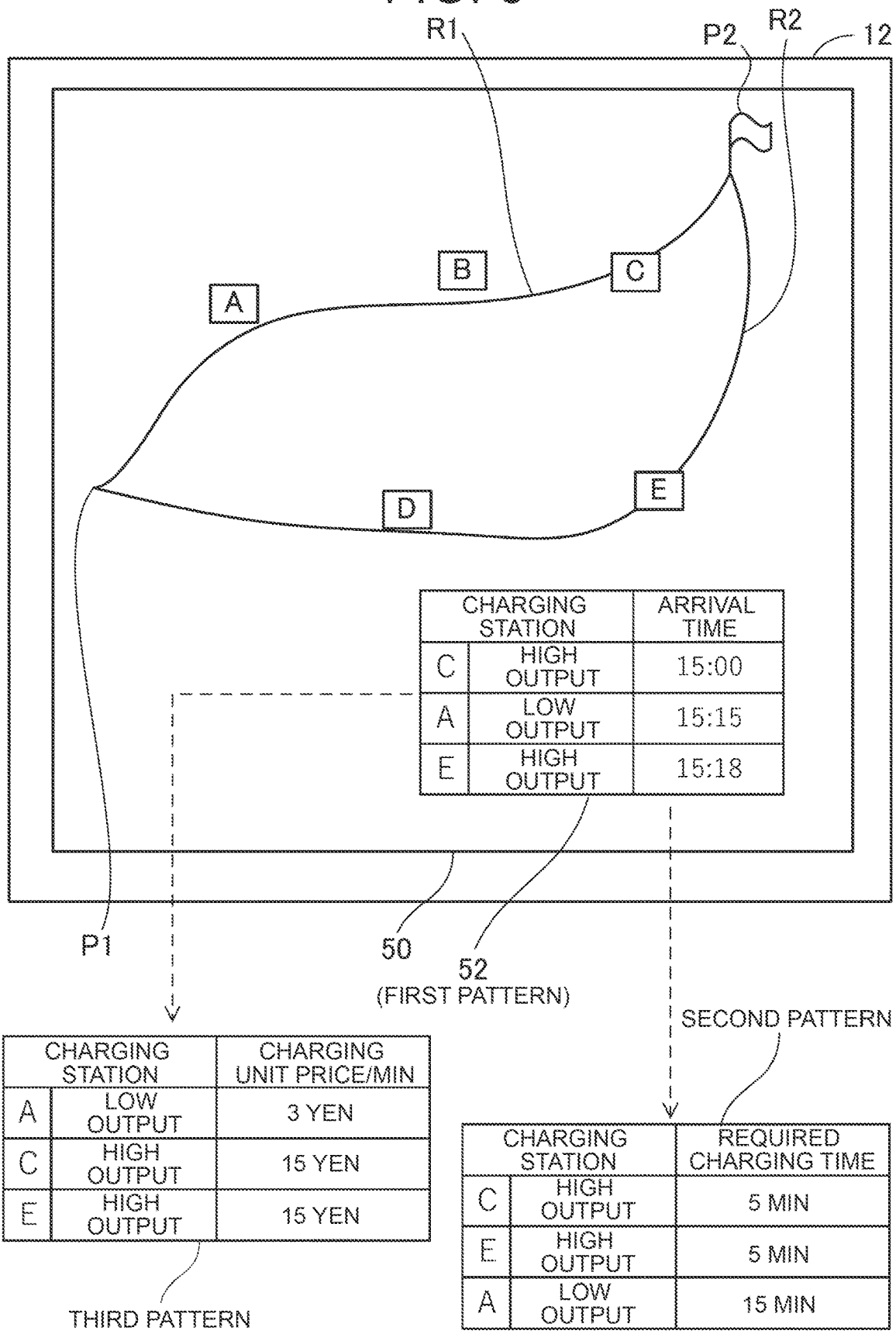

ROUTE SEARCH DEVICE

CROSS-REFERENCE TO RELATED APPLICATION

This application claims priority to Japanese Patent Application No. 2022-196277 filed on Dec. 8, 2022, incorporated herein by reference in its entirety.

BACKGROUND

1. Technical Field

The present specification discloses a route search device that searches for a route for a vehicle that runs on the power of a rechargeable battery to reach a destination.

2. Description of Related Art

Japanese Unexamined Patent Application Publication No. 2012-002778 (JP 2012-002778 A) discloses a navigation system that searches for a route to a destination of a vehicle and a charging station as a waypoint.

SUMMARY

The technique of JP 2012-002778 A does not at all consider the state of a battery mounted on the vehicle and the outputs of chargers installed in charging stations. For example, when the output of a charger is not enough for the state of the battery, the charging time of the battery may be relatively long. The present specification provides a technique for extracting a charging station suitable for the state of a battery.

A route search device disclosed in the present specification includes: a route search unit configured to search for a route for a vehicle that runs on power of a rechargeable battery to reach a destination; a station search unit configured to search for a plurality of charging stations that is geographically available to the vehicle based on the searched route and acquire output information of chargers installed in each of the charging stations; a calculation unit configured to calculate, for each of the searched charging stations, a predicted value indicating a future state of the battery when the vehicle reaches the charging station, based on a current state of the battery and a route from a current location of the vehicle to the charging station; and a recommended station extraction unit configured to extract a recommended station from the searched charging stations, based on combinations of the predicted values of the battery and the output information of the chargers.

According to the above configuration, the recommended station is extracted based on the combinations of the predicted values indicating the future state of the battery and the output information of the chargers. For example, when the future state of the battery is suitable for charging with a low-output charger, the charging station with a low-output charger is extracted as the recommended station. For example, when the future state of the battery is suitable for charging with a high-output charger, the charging station with a high-output charger is extracted as the recommended station. A charging station suitable for the state of the battery can thus be extracted.

Details and further improvements of the technique disclosed in the present specification will be described in DETAILED DESCRIPTION OF EMBODIMENTS below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flow chart of a process performed by the navigation device; and

FIG. 3 is a diagram illustrating an example of a search result displayed by the navigation device.

DETAILED DESCRIPTION OF EMBODIMENTS

Configuration of Vehicle 2; FIG. 1

Figure 1:
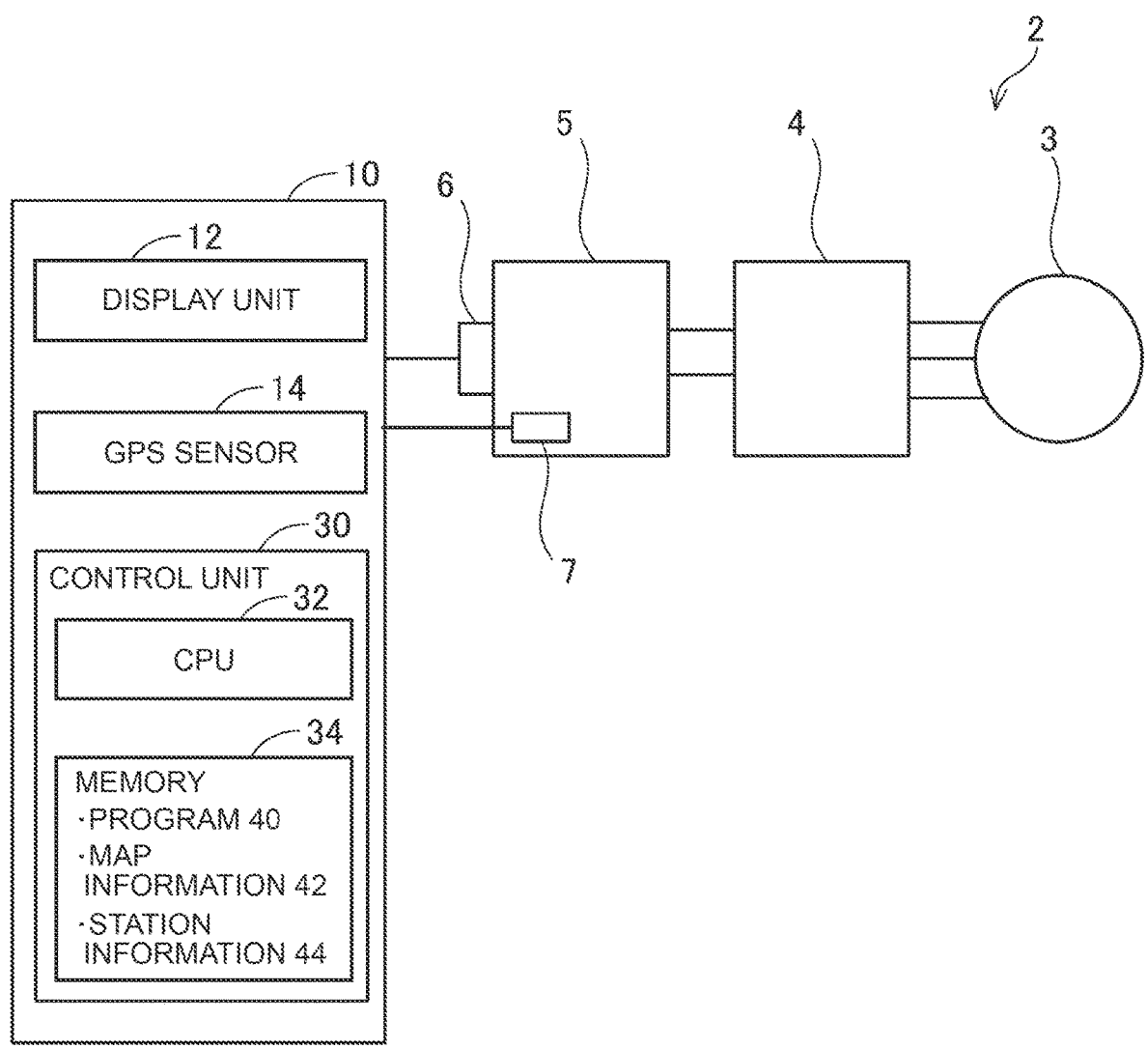
FIG. 1 is a schematic diagram illustrating a configuration of a vehicle and a navigation device.

The vehicle 2 is a rechargeable vehicle that is charged by an external power source, and a hybrid electric vehicle or the like that includes an engine. The vehicle 2 includes a traveling motor 3, a power conversion device 4, and a rechargeable battery 5. The power conversion device 4 is connected between the motor 3 and the battery 5. The power conversion device 4 includes a converter that boosts the power of the battery 5, an inverter that converts the power of the battery 5 into the drive power of the motor 3, and the like. Since the power conversion device 4 is well known, a description thereof will be omitted. The power stored in the battery 5 is reduced by discharging to the motor 3. Therefore, the battery 5 needs to be charged for the vehicle 2 to travel.

The vehicle 2 further includes a thermal sensor 6 and an SOC sensor 7. The thermal sensor 6 is attached to the battery 5 and measures a battery temperature, which is a temperature of the battery 5. In the modified example, the battery temperature may be estimated from a temperature of a component (for example, a bus bar) involved in charging of the battery 5, a current value flowing through the bus bar, and the like.

SOC sensor 7 is built in the battery 5 and measures SOC of the battery 5. SOC is an abbreviation of state of charge, and indicates the charge rate of the battery 5. SOC sensor 7 is a CPU that estimates a SOC using, for example, a voltage between terminals of the battery 5, an output current of the battery 5, and the like.

The vehicle 2 further includes a navigation device 10. The navigation device 10 is installed, for example, on a dashboard of the vehicle 2. The navigation device 10 searches for a route from the current location of the vehicle 2 to the arrival at the destination, and guides the route to the destination. In particular, in the present embodiment, the navigation device 10 searches for a plurality of charging stations that are geographically available to the vehicle 2 based on the searched route. The charging station on which the vehicle 2 is geographically available is, for example, a charging station on the searched route or a charging station installed within a predetermined range from the searched route.

The navigation device 10 includes a display unit 12, a GPS sensor 14, and a control unit 30. The display unit 12 is a touch screen that displays various types of information. The display unit 12 also functions as an operation unit that receives an instruction from a user. In the modified example, the operation unit may be a button or the like provided separately from the display unit 12.

GPS sensor 14 is a sensor that receives latitude and longitude values from a plurality of satellites of Global Positioning System (GPS). The control unit 30 may acquire the present location of the vehicle 2 by using the output from GPS sensor 14.

The control unit 30 includes a CPU 32 and memories 34. The CPU 32 performs various processes according to the program 40 stored in the memory 34. The memory 34 is, for example, a volatile memory or a non-volatile memory.

The memory 34 further stores map information 42 and station information 44. The map information 42 is geographical information indicating a map. The station information 44 is information indicating a plurality of charging station installed in a region where the vehicle 2 can travel, for example, in the entire region of the country. The station information 44 includes, for each of the plurality of charging stations, an installation location of the charging station, output information of a charger included in the charging station, a charging unit price of the charging station, etc. The output information is information for classifying each of the chargers into either a high-output charger or a low-output charger. The high-output charger is, for example, a charger having a 150 kw output, and the low-output charger is, for example, a charger having a 50 kw output. The charging unit price is, for example, a usage fee per unit. In the modified example, the map information 42 and the station information 44 may be received from the outside via an interface capable of communicating with the outside. The outside is, for example, a server on the Internet.

The control unit 30 is connected to the thermal sensor 6 and SOC sensor 7. The control unit 30 acquires measurements from each of the thermal sensor 6 and SOC sensor 7.

Process of Navigation Device 10; FIGS. 2 and 3

Referring to FIG. 2, a process executed by the CPU 32 in accordance with the program 40 will be described. In S10, the CPU 32 monitors that a destination is entered by the user into the navigation device 10. The CPU 32 proceeds to S20 if the destination is entered (YES in S10).

In S20, the CPU 32 searches for a route from the present location to the arrival of the vehicle 2 at the destination. The number of routes searched may be one or may be two or more.

In S22, the CPU 32 searches for a plurality of charging stations that are geographically available to the vehicle 2 based on the route searched in S20 from all charging stations indicated by the station information 44. Then, the CPU 32 acquires, from the station information 44, the information on the charging station, for example, the outputting information and the charging unit price, for each of the plurality of charging stations that have been searched.

In S24, the CPU 32 obtains the current state of the battery 5 from the measurements of the thermal sensor 6 and SOC sensor 7. The current state of the battery 5 includes the current battery temperature and the current SOC.

In S30, the CPU 32 selects one target charging station from the plurality of charging stations searched in S22.

In S32, the CPU 32 calculates the future state of the battery 5 when the vehicle 2 reaches the target charging station based on the current state acquired by S24 and the route from the current position to the target charging station. For example, it is possible to estimate the power consumption of the battery 5 from the distance of the route, the undulation, the speed of traveling on the route, and the like. The CPU 32 calculates a future state of the battery 5 by using the estimated power consumption. The future state of the battery 5 includes a future battery temperature and a future SOC.

In S34, the CPU 32 determines whether the future battery temperature at the target charging station is within normal limits. As used herein, the "normal range" is a range between a first threshold and a second threshold. The first threshold is, for example, a temperature for determining that the battery temperature is excessively high. The second threshold is, for example, a temperature for determining that the battery temperature is excessively low. For example, in a situation where the battery temperature is out of the normal range, when the battery 5 is charged by the high-output charger, the load of the battery 5 may become excessive. In situations where the battery temperature is out of the normal range, it is recommended to charge the battery 5 with a low-output charger.

The CPU 32 proceeds to S40 when it is determined that the future battery temperature for the target charging station is out of the normal range (NO in S34). In S40, the CPU 32 determines whether the output information of the target charging station indicates a low-output charger. The CPU 32 proceeds to S50 when it is determined that the output information of the target charging station indicates a low-output charger (YES in S40). In S50, the CPU 32 determines the target charging stations with the low-output chargers to be the recommended stations. The recommended station is a charging station recommended for use by the user. When S50 process is completed, the CPU 32 proceeds to S52. On the other hand, when it is determined that the output information of the target charging stations does not indicate the low-output charger (NO in S40), the CPU 32 skips S50 and proceeds to S52. In this case, the target charging station is not determined as the recommended station.

In S52, the CPU 32 determines whether all of the plurality of charging stations searched in S22 have been selected as the target charging station. When the CPU 32 determines that all of the plurality of charging stations searched in S22 have not been selected as the target charging station (NO in S52), it returns to S30. On the other hand, when the CPU 32 determines that all of the plurality of charging stations searched in S22 have been selected as the target charging station (YES in S52), S60 proceeds.

In S60, the CPU 32 executes a display process for displaying all the recommended stations determined in S50 on the display unit 12. When S60 ends, the CPU 32 ends the process of FIG. 2.

Further, the CPU 32 proceeds to S36 when it is determined that the future battery temperature in the target charging station is within the normal range (YES in S34). In S36, the CPU 32 determines whether a future SOC in the target charging station is equal to or greater than a predetermined value. The fact that the future SOC in the target charging station is equal to or greater than the predetermined value means that the charging time of the battery 5 is relatively short even in the low-output charger. The CPU 32 proceeds to S40 when it is determined that the future SOC in the target charging station is equal to or greater than a predetermined value (YES in S36).

Further, when the CPU 32 determines that the future SOC in the target charging station is less than the predetermined value (NO in S36), S42 proceeds. The fact that the future SOC in the target charging station is less than the predetermined value means that the charging time of the battery 5 is relatively long in the low-output charger. In other words, it is recommended to charge the battery 5 with a high-output charger.

In S42, the CPU 32 determines whether the output information of the target charging station indicates a high-output charger. The CPU 32 proceeds to S50 when it is determined that the output information of the target charging station indicates a high-output charger (YES in S42). In S50 where YES has been determined in S42, the target charging stations with high-output charging are determined to be the recommended stations.

SPECIFIC EXAMPLE; FIG. 3

FIG. 3 shows a specific example of the screen 50 displayed on the display unit 12 in S60 display process. In this case, the CPU 32 searches for two routes R1, R2 from the current location P1 to the destination P2 (S20 in FIG. 2). The CPU 32 searches for five charging stations A to E that are geographically available to the vehicle 2 from all charging stations, based on the two routes R1, R2 (S22). Then, the CPU 32 determines three recommended stations A, C, and E from the five charging stations A to E (S30 to S50). For example, for the charging station B, the future battery temperature is within the normal range and the future SOC is less than the predetermined value, but the charger of the charging station B is a low-output charger. Therefore, the charging station B is not selected as the recommended station (YES in S34, NO in S36, and NO in S42) For example, for the charging station D, the future battery temperature is within the normal range and the future SOC is equal to or higher than the predetermined value, but the charger of the charging station D is a high-output charger. Therefore, the charging station D is not selected as the recommended station (YES in S34, YES in S36, and NO in S40).

The screen 50 displays the two routes R1, R2 and the five charging stations A to E. The screen 50 also displays a recommended station list 52. The recommended station list 52 is a list of recommended stations determined in S50 of FIG. 2. In this case, the recommended station list 52 includes the three recommended stations A, C, and E.

In this embodiment, when a plurality of recommended stations is determined in S50 of FIG. 2, the CPU 32 prioritizes the plurality of recommended stations. In the present embodiment, the order of priority is set by any of first to third patterns.

The first pattern is the order based on expected arrival times at which the destination is reached via the recommended stations. As shown in FIG. 3, a recommended station with an earlier expected arrival time is displayed higher on the list. The estimated arrival time includes a travel time for the route and a required charging time at the recommended station. The required charging time is the total time of the charging preparation time from the arrival at the recommended station until the battery 5 is connected to the charger and the charging time during which charging is actually performed. The charging preparation time is calculated based on, for example, the availability of the charger when the vehicle arrives at the recommended station. The charging time is calculated based on, for example, a future SOC at the recommended station and the output information of the recommended station. By using the order of priority based on the expected arrival times, the user can determine which recommended station to use in consideration of the expected arrival time.

The second pattern is the order based on the required charging times at the recommended stations. As shown in FIG. 3, a recommended station with a shorter required charging time is displayed higher on the list. By using the order of priority based on the required charging times, the user can determine which recommended station to use in consideration of the required charging time.

The third pattern is the order based on the charging unit prices at the recommended stations. As shown in FIG. 3, a recommended station with a lower charging unit price is displayed higher on the list. By using the order of priority based on the charging unit prices, the user can determine which recommended station to use in consideration of the charging unit price.

For example, the CPU 32 displays by default the recommended station list 52 based on the order of priority of the first pattern. When the CPU 32 receives a command to change the pattern, the CPU 32 displays the recommended station list 52 based on the order of priority of the pattern according to the command, for example, the second pattern, instead of the first pattern.

Effects of Embodiment

According to the configuration of the present embodiment, the CPU 32 acquires the output information of the charger from the station information 44 (S22 in FIG. 2), and calculates a predicted value indicating a future state of the battery 5 (S32). The CPU 32 then extracts a recommended station based on the predicted value indicating a future state of the battery and the output information of chargers (S30 to S50). For example, when the future state of the battery is suitable for charging with a low-output charger (YES in S40), a charging station with a low-output charger is extracted as a recommended station (S50). Also, for example, when the future state of the battery is suitable for charging with a high-output charger (YES by S42), a charging station with a high-output charger is extracted as a recommended station (S50). A charging station suitable for the state of the battery can thus be extracted.

Correspondence

The navigation device 10 is an example of the "route search device." The vehicle 2 and the battery 5 are examples of the "vehicle" and the "battery," respectively. The output information in the station information 44 is an example of the "output information." The five charging stations A to E are an example of the "plurality of charging stations."

The CPU 32 that performs S20 in FIG. 2 and the CPU 32 that performs S22 in FIG. 2 are an example of the "route search unit" and the "station search unit," respectively. The CPU 32 that performs S32 and the CPU 32 that performs S34 to S50 are an example of the "calculation unit" and the "recommended station extraction unit," respectively.

In the following, points to be noted regarding the technique shown in the examples will be described. The "route search device" is not limited to the navigation device 10, and may be, for example, an external device provided separately from the vehicle 2, such as a smartphone or a server on the Internet. In this modification, the "output information" may be received by the external device from, for example, another device on the Internet. The information indicating the "current state of the battery" may be sent from the vehicle 2 to the external device by using a wireless or wired communication method.

The determination of S34 in FIG. 2 may be made, and the determination of S36 in FIG. 2 may not be made. In this modification, the "predicted value of the battery" is a "predicted temperature of the battery." The determination of S36 in FIG. 2 may be made, and the determination of S34 in FIG. 2 may not be performed. In this modification, the "predicted value of the battery" is a "predicted SOC of the battery."

The recommended stations determined in S50 of FIG. 2 may not be prioritized. For example, the order of the recommended stations in the recommended station list 52 may be random. For example, the screen 50 may not include the recommended station list 52, and the recommended stations A, C, and E may be displayed on the screen 50 and the other charging stations B and D may not be displayed on the screen 50.

The pattern of the order of priority need only be any one of the first to third patterns. For example, the recommended station list 52 may be displayed in the first pattern and may not be displayed in the second and third patterns.

In the case where the order of priority is the first pattern, only the charging station C may be displayed on the screen 50, and the charging stations A and E may not be displayed on the screen 50. In this modification, displaying the most recommended charging station on the screen 50 and not displaying the other recommended stations on the screen 50 is an example of "prioritizing."

While specific examples of the present disclosure have been described in detail above, these are merely illustrative and are not intended to limit the scope of the claims. Various modifications and alterations of the specific examples illustrated above are included in the technique described in the claims. The technical elements described in this specification or in the drawings exhibit technical utility alone or in various combinations, and are not limited to the combinations described in the claims at the time of filing. The technique illustrated in the present specification or the drawings can achieve a plurality of objects at the same time, and has technical usefulness by achieving one of the objects.

What is claimed is:

1. A route search device comprising:
a display:
a memory that stores station information; and
a processor configured to:
search for a route for a vehicle that runs on power of a rechargeable battery to reach a destination;
search for a plurality of charging stations that are geographically available to the vehicle based on the searched route;
acquire the station information for each charging station of the plurality of charging stations from the memory, the station information including output information of a charger installed at each charging station;
calculate, for each charging station, a predicted value indicating a future state of the battery when the vehicle reaches the charging station, based on a current state of the battery and a route from a current location of the vehicle to the charging station;
determine a recommended station from the plurality of charging stations, based on the predicted value of the battery and the output information of the charger; and
simultaneously display, on the display, a map including the searched route and the plurality of charging stations, and a listing that includes only the recommended station determined from the plurality of charging stations.

2. The route search device according to claim 1, wherein the predicted value is at least one of a predicted temperature of the battery or a predicted state of charge of the battery.

3. The route search device according to claim 2, wherein:
the processor is further configured to calculate the predicted temperature of the battery;
the output information indicates whether the charger is a high-output charger or a low-output charger; and
the processor is configured to determine, as the recommended station, the charging station for which the predicted temperature of the battery will fall outside of a predetermined normal range and the output information indicates the low-output charger.

4. The route search device according to claim 2, wherein:
the processor is further configured to calculate the predicted temperature of the battery and the predicted state of charge of the battery;
the output information indicates whether the charger is a high-output charger or a low-output charger; and
the processor is further configured to determine following charging stations, as the recommended station
the charging station for which the predicted temperature of the battery is within a predetermined normal range, the predicted state of charge of the battery is equal to or higher than a predetermined threshold, and the output information indicates the low-output charger, and
the charging station for which the predicted temperature of the battery is within the predetermined normal range, the predicted state of charge of the battery is less than the predetermined threshold, and the output information indicates the high-output charger.

5. The route search device according to claim 1, wherein in a case where the processor determines multiple recommended stations, the processor is further configured to prioritize the recommended stations based on at least one of the following: an expected arrival time at which the destination is reached via the recommended station, a required charging time at the recommended station, and a charging unit price at the recommended station.

6. The route search device according to claim 1, wherein:
the predicted value is a predicted temperature of the battery;
the output information is information for classifying the charger into either a high-output charger or a low-output charger; and
the processor is configured to determine, as the recommended station, the charging station for which the predicted temperature of the battery is higher than a predetermined normal range and the output information indicates the low-output charger.

7. The route search device according to claim 1, wherein in a case where the processor determines multiple recommended stations, the processor is further configured to:
acquire additional information for each recommended station of the multiple recommended stations, the additional information including
an estimated arrival time at the destination via the recommended station,
a required charging time at the recommended station, and
a charging unit price at the recommended station;
display, in the list, the multiple recommended stations arranged in order of priority based on the estimated arrival time;
update the list to display the multiple recommended stations arranged in order of priority based on the required charging time, upon receiving an instruction from a user of the vehicle to change the priority; and
update the list to display the multiple recommended stations arranged in order of priority based on the charging unit price, upon receiving a further instruction from the user of the vehicle to change the priority.

* * * * *